United States Patent
Banerjee et al.

(10) Patent No.: US 10,248,469 B2
(45) Date of Patent: Apr. 2, 2019

(54) SOFTWARE BASED COLLECTION OF PERFORMANCE METRICS FOR ALLOCATION ADJUSTMENT OF VIRTUAL RESOURCES

(71) Applicant: International Business Machines Corporation, Armonk, NY (US)

(72) Inventors: Pradipta K. Banerjee, Bangalore (IN); Aneesh K. Kizhake Veetil, Bangalore (IN); Dipankar Sarma, Bangalore (IN); Vaidyanathan Srinivasan, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 130 days.

(21) Appl. No.: 15/409,618

(22) Filed: Jan. 19, 2017

(65) Prior Publication Data
US 2018/0203738 A1    Jul. 19, 2018

(51) Int. Cl.
*G06F 9/46* (2006.01)
*G06F 9/50* (2006.01)
*G06F 9/455* (2018.01)

(52) U.S. Cl.
CPC ........ *G06F 9/5077* (2013.01); *G06F 9/45558* (2013.01); *G06F 2009/4557* (2013.01); *G06F 2009/45591* (2013.01)

(58) Field of Classification Search
CPC ............... G06F 9/5077; G06F 9/45558; G06F 2009/4557; G06F 2009/45591
See application file for complete search history.

(56) References Cited

U.S. PATENT DOCUMENTS 9,491,112 B1    11/2016  Patel et al.
9,798,565 B2 *  10/2017  Persson ............... G06F 9/45558
2009/0055834 A1  2/2009  Ding
(Continued)

OTHER PUBLICATIONS

Mell et al., "The NIST Definition of Cloud Computing", Recommendations of the National Institute of Standards and Technology, NIST Special Publication 800-145, Computer Security Division Information Technology Laboratory, National Institute of Standards and Technology, Gaithersburg, MD 20899-8930, Sep. 2011, 7 pages.

(Continued)

*Primary Examiner* — Camquy Truong
(74) *Attorney, Agent, or Firm* — Christopher K. McLane

(57) ABSTRACT

In an approach to collecting and processing performance metrics, one or more computer processors assign an identifier corresponding to a first workload associated with a first virtual machine. The one or more computer processors record resource consumption data of at least one processor at a performance monitoring interrupt. The one or more computer processors create a relational association of the first workload and the first virtual machine to the resource consumption data of the at least one processor. The one or more computer processors determine if the first workload is complete. Responsive to determining that the first workload is not complete, the one or more computer processors calculate a difference in recorded resource consumption data between the performance monitoring interrupt and a previous performance monitoring interrupt.

9 Claims, 6 Drawing Sheets

(56) References Cited

U.S. PATENT DOCUMENTS

| | | |
|---|---|---|
| 2010/0235836 A1 | 9/2010 | Bratanov |
| 2012/0317570 A1 | 12/2012 | Dalcher et al. |
| 2014/0201357 A1 | 7/2014 | Tang et al. |
| 2016/0019107 A1 | 1/2016 | North |
| 2016/0224094 A1* | 8/2016 | Klein ........................ G06F 1/26 |
| 2016/0232036 A1 | 8/2016 | Zhu et al. |
| 2018/0039523 A1* | 2/2018 | Akamine .............. G06F 9/5044 |

OTHER PUBLICATIONS

Appendix P, List of IBM Patents or Patent Applications Treated As Related, 2 pages, dated Jan. 8, 2018.

Banerjee et al., "Software Based Collection of Performance Metrics for Allocation Adjustment of Virtual Resources", U.S. Appl. No. 15/841,394, filed Dec. 14, 2017, 32 pages.

Banerjee et al., "Software Based Collection of Performance Metrics for Allocation Adjustment of Virtual Resources", U.S. Appl. No. 15/848,925, filed Dec. 20, 2017, 32 pages.

\* cited by examiner

SOFTWARE BASED COLLECTION OF PERFORMANCE METRICS FOR ALLOCATION ADJUSTMENT OF VIRTUAL RESOURCES

BACKGROUND

The present invention relates generally to virtual machines and more particularly to software based collection of performance metrics and allocation adjustment of virtual resources.

In various virtual system environments, including clustered and cloud system environments, virtual machines can be deployed and executed based on virtual resource definitions. Virtual resource definitions for virtual machines may include specific requirements regarding the number and types of resources, where types of resources include capabilities of each individual resource or group of resources. In addition to processor and memory resources, virtual machines typically require other resources such as, I/O adapters. These adapters are often virtual adapters, hosted by physical adapters that share the limited capacities and capabilities provided by the physical adapters. In the event virtual machines are activated and deactivated with high frequency, the required adapter resources are assigned, released, and reassigned.

SUMMARY

Embodiments of the present invention include a method, computer program product and computer system for collecting and processing performance metrics. The method may include one or more computer processors assigning an identifier corresponding to a first workload associated with a first virtual machine. The one or more computer processors record resource consumption data of at least one processor at a performance monitoring interrupt. The one or more computer processors create a relational association of the first workload and the first virtual machine to the resource consumption data of the at least one processor. The one or more computer processors determine if the first workload is complete. Responsive to determining that the first workload is not complete, the one or more computer processors calculate a difference in recorded resource consumption data between the performance monitoring interrupt and a previous performance monitoring interrupt.

DETAILED DESCRIPTION

Figure 1:
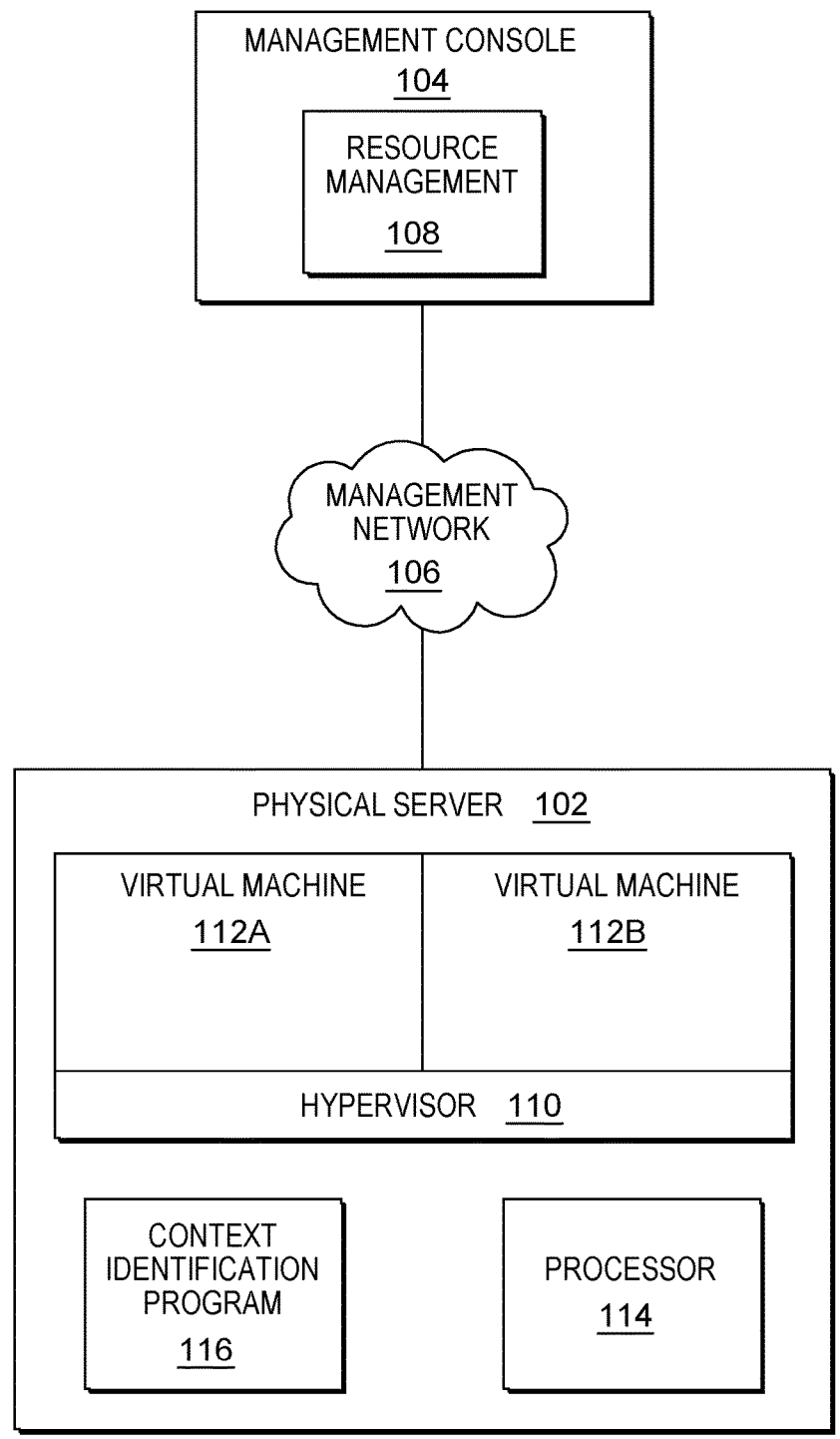
FIG. 1 is a functional block diagram illustrating a distributed data processing environment, in accordance with an embodiment of the present invention.

Resource allocation is typically performed on demand when resources are needed to activate a resource consumer or when additional resources are requested for an active resource consumer. Correspondingly, resource de-allocation is typically performed when the resource consumer is deactivated. Therefore, on subsequent resource consumer activations, different host resources can be allocated to the virtual resources. Also, the same host resource can be allocated to different virtual resources of the same or different resource consumers at different points in time. Virtual resources that are based on a particular physical resource, share the capacity and capabilities of the particular physical resource. Examples include virtual network adapters (vNIC), virtual storage area network adapters (vHBA), other types of virtual input-output (I/O) adapters based on physical adapters, and virtual accelerator engines based on a physical accelerator engine. Examples of a physical accelerator engine include a cryptographic engine, a compression engine, and a sorting engine.

Resource consumption monitoring facilitates resource allocation. Resource consumption monitoring requires performance monitoring interrupts (PMIs), such as event based interrupts and time based interrupts. Event based interrupts interrupt the processing of the workload after a designated number of processing events for each workload. For example, an event based PMI may occur every ten processor events, and a workload may require 100 processor events to be completed. Upon completion of the workload, a resource consumption monitoring mechanism would create eleven resource consumption data points which function as snapshots of the processor resources consumed by the workload. Time based interrupts interject the processing of the workload after a predetermined time interval for each workload. For example, a time based PMI may occur every millisecond, and a workload may require twenty milliseconds to be completed. For example, a resource consumption monitoring mechanism using time based PMIs creates twenty-one resource consumption data points which function as snapshots of the processor resources consumed by the workload upon completion of the workload.

A computing system supporting virtualization may include one or more virtual I/O servers (VIOS) or partitions. A virtual I/O server is a software appliance with which associates physical I/O resources to virtualized I/O resources, such as virtual machine adapters and virtual client adapters that enables such resources to be shared among multiple client logical partitions, such as virtual machines. A virtual I/O server provides virtual I/O resources to client partitions and enables shared access to physical I/O resource such as disks, tape, and optical media. For example, a virtual I/O server can provide both virtualized storage and network adapters, making use of the virtual small computer system interface (SCSI) and virtual Ethernet facilities. In some instances, a virtual machine may exclusively "own" an I/O adapter. In other instances, partitions may share an I/O adapter by utilizing the VIOS partition.

In order to utilize a virtual resource, a resource activation is typically performed. Resource activation actions can include clearing main memory before assignment to a resource consumer, and updating network configuration and storage access tables in host firmware (e.g., physical server and/or hypervisors). The activation procedure can depend on a virtualization type, where the virtualization type is how the host resource is virtualized so that, for instance, a single physical host resource represents multiple virtualized host resources. The activation procedure can also depend on which virtual machine the resource consumer is deployed, more particularly, on which hypervisor level. Activation of both the virtual resource and the assigned host resource enables resource utilization by server firmware, hypervisors, and privileged operating systems.

In order to allocate resources, resource monitoring systems should be in place to track which workloads are in progress on which physical or virtual resources. Often, resource management systems, such as performance monitoring units (PMU), track and record physical and virtual resource consumption by means of performance counters. Software-based resource management systems can improve the measuring of processor operational characteristics and, in some embodiments, supplant the need for hardware-based monitoring systems.

Example embodiments in accordance with the present invention will now be described in detail with reference to the figures. FIG. 1 is a functional block diagram illustrating a distributed data processing environment, in accordance with one embodiment of the present invention. The distributed data processing environment includes physical server 102 and management console 104, all interconnected over management network 106.

Physical server 102 represents a computer system utilizing clustered computers and components that act as a single pool of seamless resources when accessed through an I/O network (not illustrated in FIG. 1), as is common in data centers and with cloud computing applications. In general, physical server 102 is representative of any programmable electronic device or combination of programmable electronic devices capable of executing machine-readable program instructions and communicating with other computer devices via a network. In another embodiment, there are multiple physical servers, such as physical server 102, connected to management network 106.

Management console 104 manages physical server 102 and the components therein. In an embodiment, management console 104 provides both a graphical user interface (GUI) and an application programming interface (API) for automated configuration management. Resource manager 108, residing in management console 104, enables implementation of policy driven host resource allocation and host resource allocation adjustment. Resource manager 108 may utilize host resource requirements, where the host resource requirements specify resource allocations for resource definitions of a particular virtual machine (e.g., virtual machine 112A and 112B). Resource manager 108 may also utilize host resource characteristics for resource allocations, where host resource characteristics may include an adapter type, connectivity to a particular type of a network, and a particular type of assist or acceleration processor (e.g., cryptographic processors).

In general, management network 106 may be any combination of connections and protocols that may support communications between physical server 102 and management console 104. Management network 106 may include, for example, a local area network (LAN), a wide area network (WAN), such as the internet, a cellular network, or any combination of the preceding, and may further include wired, wireless, and/or fiber optic connections.

In the depicted embodiment, hypervisor 110 provides execution environments for multiple virtual machines, such as virtual machine 112A and virtual machine 112B, to run on physical server 102. In addition to virtual machine 112A and 112B, hypervisor 110 may host one or more additional hypervisors not illustrated in FIG. 1. Therefore, virtual machine 112A, virtual machine 112B, and hypervisor 110 may execute within one or more underlying levels of hypervisors. A server cluster may include one or more physical servers 102, therefore, virtual machines may execute on different nodes (i.e., physical servers) of the server cluster. For discussion purposes, hypervisor 110, virtual machine 112A, and virtual machine 112B each represent an example of a virtual machine, containers running on a virtual machine, container running without a virtual machine, and workloads running without a virtual machine. Containers, like virtual machines provide a way to isolate applications and provide a virtual platform for applications to run on. Several differences exist between a container and a virtual machine running on a hypervisor system. A container requires an underlying operating system that provides the basic services to all of the containerized applications using virtual-memory support for isolation. Virtual machines have their own operating system using hardware support. Often, container systems provide isolation between containers.

Virtual machine 112A, virtual machine 112B, and hypervisor 110 are resource consumers. Virtual resources are supported by physical resources, which may exist internally or externally of physical server 102. Typically, external and internal host resources include virtual host resources. Examples of virtual host resources include virtual processors based on physical processors and virtual network adapters are based on physical network adapters. Examples of provider virtual host resources may include physical server 102 (hardware and firmware), hypervisor 110, or an independent virtualization entity not illustrated in FIG. 1. In another embodiment, an I/O network may connect to external host resource pools (i.e., external physical host resources), where each external host resource pool includes external host resources (i.e., external virtual host resources).

Processor 114 executes programmable instructions that create a means for implementing the functions/acts specified in the flowchart and/or block diagram or blocks. Processor 114 may be a processor of a general purpose computer, a special purpose computer, or other programmable data processing apparatus to produce a machine. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram or blocks.

In the depicted embodiment, context identification program 116 assigns resource allocation identifiers, such as the time, the workload, the resource consumption, the processor/core, and the virtual machine. Resource allocation identifiers allow various components of the distributed data processing environment to identify a virtual machine associated with a workload on a particular processor or core and measure resource consumption associated with each workload. Context identification program 116 records the resource allocation identification data and the resource consumption data at predetermined time intervals. In another embodiment, context identification program 116 may assign and record parameters associated with resource allocation identifiers after a processor outputs a predetermined amount of data associated with one or more workloads. Context identification program 116 may further process the collected data to extract performance metrics. Context identification program 116 may further communicate the extracted performance metrics to various components of the distributed data processing environment.

Context identification program 116 executes a series of steps in order to track resource allocation by attaching resource allocation identifiers corresponding to a workload performed by one or more virtual machines, to associate the resource consumption of the workload at periodic time intervals in a uniform time scale. As depicted, context identification program 116 assigns an identifier corresponding to a workload and a virtual machine assigned to the workload. Context identification program 116 records the resource consumption of particular processors or processor cores at predetermined time intervals, such as a time interval of 100 milliseconds, also referred to as a rolling buffer. Context identification program 116 subsequently associates the workload and the associated virtual machine with the recorded resource consumption and time interval data. Context identification program 116 then identifies if a workload is complete. If the workload is not completed, context identification program 116 calculates the change in resource consumption between each time interval associated with the workload and the associated virtual machine in order to record the changes in resource consumption over time in a rolling buffer. If the workload is completed, context identification program 116 assigns a new workload to the unoccupied virtual machine. Following the new assignment, context identification program 116 assigns a new identifier to a subsequent workload and identifies the associated virtual machine. Context identification program 116 aggregates the virtual machine identification, workload identification, resource consumption and time interval data in the rolling buffer after context identification program 116 calculates changes in resource consumption over time following a determination that the workload is incomplete. Context identification program 116 then communicates the aggregated data to resource manager 108. However, context identification program 116 may also be incorporated into resource manager 108 in other embodiments.

Figure 2:
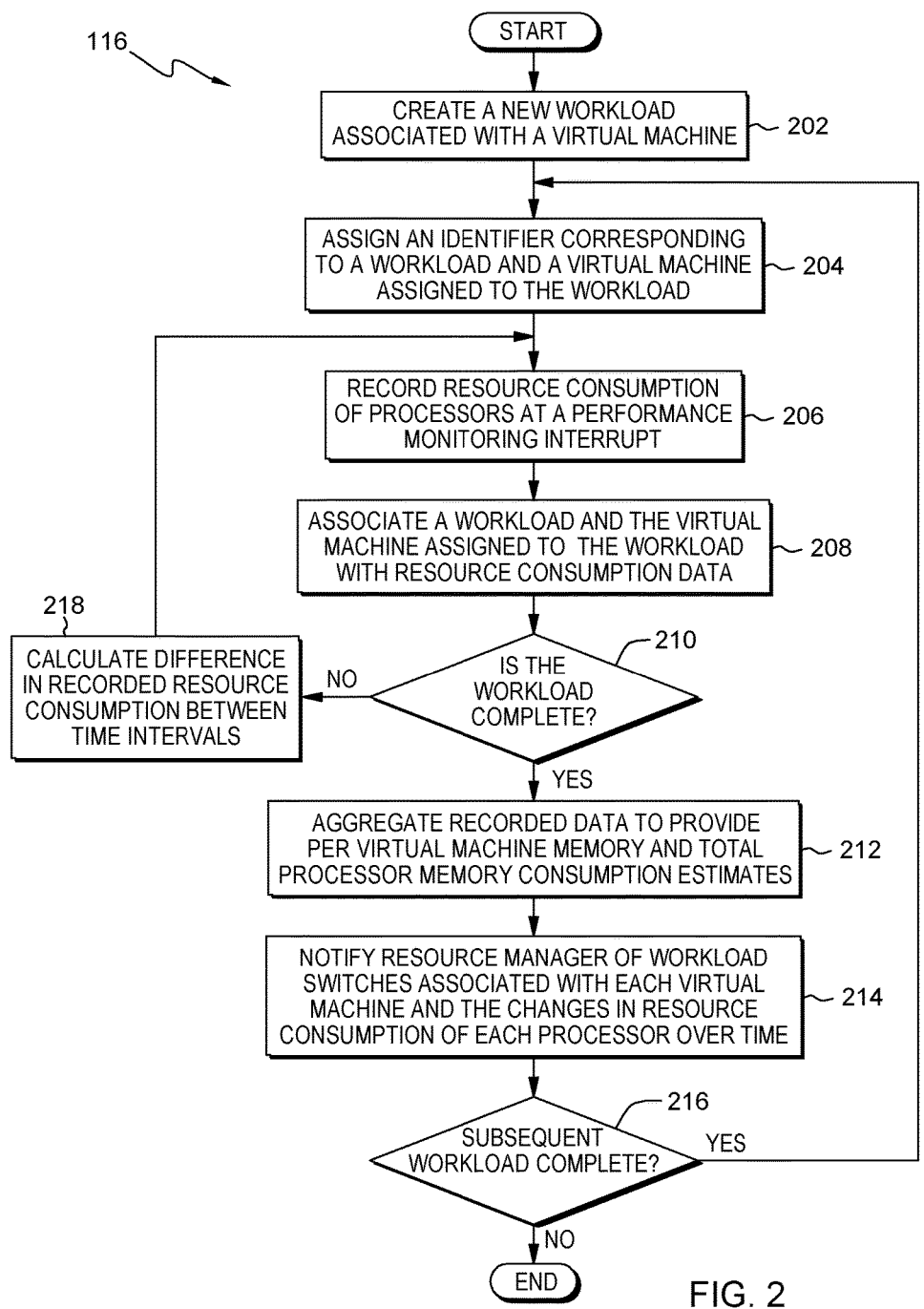
FIG. 2 is a flowchart depicting one embodiment of a performance metrics collection method that may be executed by a context identification program, in accordance with the present invention.

FIG. 2 is a flowchart depicting one embodiment of a context identification method that may be executed by context identification program 116, in accordance with an embodiment of the present invention. The steps depicted in FIG. 2 begin when context identification program 116 receives one or more new workloads to add to the existing queue of workloads.

Context identification program 116 creates a new workload associated with a virtual machine (step 202). For example, context identification program 116 creates a workload based on a particular task such as batch or online transaction processing for web-based applications, such as music and video streaming services. In another example, context identification program 116 may divide an existing workload into multiple workloads that are assigned to one or more virtual machines. In another embodiment, context identification program 116 may create a new workload associated with a container on a physical server.

Context identification program 116 assigns an identifier corresponding to the created workload and the virtual machine assigned to the workload (step 204). For example, context identification program 116 attaches a first identifier to a first workload processed by a first virtual machine and a second identifier to a second and third workload processed by a second virtual machine. In another embodiment, context identification program 116 shares the identifier with an off-core monitoring engine, such as resource manager 108, such that the accounting of resource consumption per workload and overall workload is automatically aggregated on a per-context basis by the off-core monitoring engine. In another embodiment, context identification program 116 attaches an identifier corresponding to virtual I/O servers (VIOS) associated with particular virtual machines such that I/O data associated with particular workloads can also be aggregated on a per-context basis by context identification program 116 or by the off-core monitoring engine, such as resource manager 108.

Context identification program 116 records the resource consumption of one or more processors or processor cores at a performance monitoring interrupt (PMI) (step 206). For example, a predetermined time interval may be set at ten milliseconds for context identification program 116 which results in context identification program 116 executing a time based sampling of the software execution state of one or more processors or processor cores by means of interrupting the normal execution flow of the one or more processors or processor cores in a uniform time scale every ten milliseconds. In another embodiment, context identification program 116 may record resource consumption data by interrupting the normal execution flow after a predetermined amount of processor events. For example, a predetermined amount of processor event may be set at ten processor events which results in context identification program 116 executing an event-based sampling of the software execution state by means of interrupting the normal execution flow every ten processor events.

Context identification program 116 associates a workload and the virtual machine assigned to the workload with the resource consumption data collected using performance monitoring interrupts (PMIs) in a rolling buffer (step 208). In one embodiment, context identification program 116 may associate the workload and the virtual machine assigned to the workload with the resource consumption of processors or processor cores at periodic time intervals in a uniform time scale in a rolling buffer. For example, context identification program 116 may record a rolling buffer identifying the resource consumption of a workload and the virtual machine processing the workload at ten millisecond intervals. However, context identification program 116 is not limited to the time interval in the aforementioned example and may record resource consumption using a different time interval.

In another embodiment, context identification program 116 may associate a workload and the virtual machine assigned to the workload with the resource consumption of processors or processor cores at a predetermined amount of processor events using an event-based PMI. A processor event is a stimulus that triggers a state transition, except when an event occurs as a result of an exit action. The name of the processor event, derives from the name of the notifier for the event and the action the notifier performed. For example, context identification program 116 may record a rolling buffer identifying the resource consumption of a workload and the virtual machine processing the workload every ten processor events. A processor event may be a user-defined or program-defined unit defining an amount of processing power used to the process the workload. In yet another embodiment, context identification program 116 may associate a VIOS to a workload and virtual machine assigned to the workload at periodic time intervals in a uniform time scale in a rolling buffer in order to incorporate I/O data into the resource consumption estimate of the processor or processor cores.

Context identification program 116 determines if a workload is completed (decision block 210). For example, context identification program 116 determines whether the workload is no longer consuming processor resources, which indicates that a processor or processor core completed the workload. In the case of a processor or virtual machine processing multiple workloads, context identification program 116 may determine that a particular workload is finished when the overall resource consumption on a particular processor drops to reflect the completion of a workload. For example, context identification program may correlate a core level event sample with a chip level event sample using the in-memory rolling buffer containing event counters over different sampling periods and use a statistical estimation to determine a per-virtual machine or per-container chip level resource consumption estimation. In another embodiment, context identification program 116 may associate inbound I/O transaction from I/O devices and accelerators using inbound I/O translation units that can map target addresses associated with a virtual machine or container to account for the resources consumed by the inbound I/O transactions on particular virtual machines or containers.

Responsive to determining that a processor or processor core did not complete a workload ("No" branch, decision block 210), context identification program 116 calculates the difference in recorded resource consumption between a previous and subsequent time interval for the workload on the processor or processor core (step 218). For example, context identification program 116 identifies that the recorded resource consumption for a first workload on a first virtual machine dropped from 65% load on the processor at a first time interval to a 55% load on the processor at a second time interval and calculates that the resource consumption fell by 10%. In another example, context identification program 116 identifies that the recorded resource consumption for a first workload on a virtual machine increased from 85% at a first time interval to 95% at a second time interval and calculates that the resource consumption increased by 10%. In another embodiment, given an increase in resource consumption to near full capacity of the processor, context identification program 116 may take additional actions to lower the burden on the processor by communicating the resource consumption data to resource manager 108 for re-allocation.

In alternative embodiments, in addition to calculating changes in resource consumption over a first and a second time intervals, context identification program 116 returns to step 206 and continues to record resource consumption at predetermined time intervals in a loop. For example, context identification program 116 continues to record the resource consumption for a third time interval which context identification program uses to calculate the change in resource consumption between the second and third time interval.

Responsive to determining that a processor or processor core completed a workload ("Yes" branch, decision block 210), context identification program 116 switches the virtual machine associated with the completed workload to a subsequent workload (step 212).

Following the switch to a subsequent workload, context identification program 116 also automatically aggregates the recorded resource consumption data of the completed workload to provide a per virtual machine memory bandwidth and a total processor memory bandwidth consumption estimate (step 212). For example, upon completion of a workload, context identification program 116 records data regarding the resource consumption by the workload on the virtual machine as well as an indicator that the workload is complete in a rolling buffer. In another embodiment, context identification program 116 may communicate the calculated changes in resource consumption over the first and the second time intervals directly to resource manager 108 which automatically aggregates the data to provide a per virtual machine memory bandwidth and a total processor memory bandwidth consumption estimate.

Context identification program 116 notifies resource manager 108 of the workload switches associated with each virtual machine and the changes in resource consumption of each processor over time (step 214). In another embodiment, context identification program 116 aggregates the data and resource manager 108 pulls the information from the data stored in the rolling buffer when needed to calculate resource consumption statistics per workload, per virtual machine, per processor or processor core, and for the processor overall.

Following context identification program 116 notifying resource manager 108 of the workload switches associated with each virtual machine and resource consumption over time, context identification program 116 determines whether a subsequent workload exists (decision block 216).

Responsive to determining that a subsequent workload exists ("Yes" branch, decision block 216), context identification program 116 returns to step 204 and assigns an identifier corresponding to a subsequent workload and the virtual machine assigned to the subsequent workload (step 204).

Responsive to determining that a subsequent workload does not exist ("No" branch, decision block 216), context identification program 116 ends.

Figure 3:
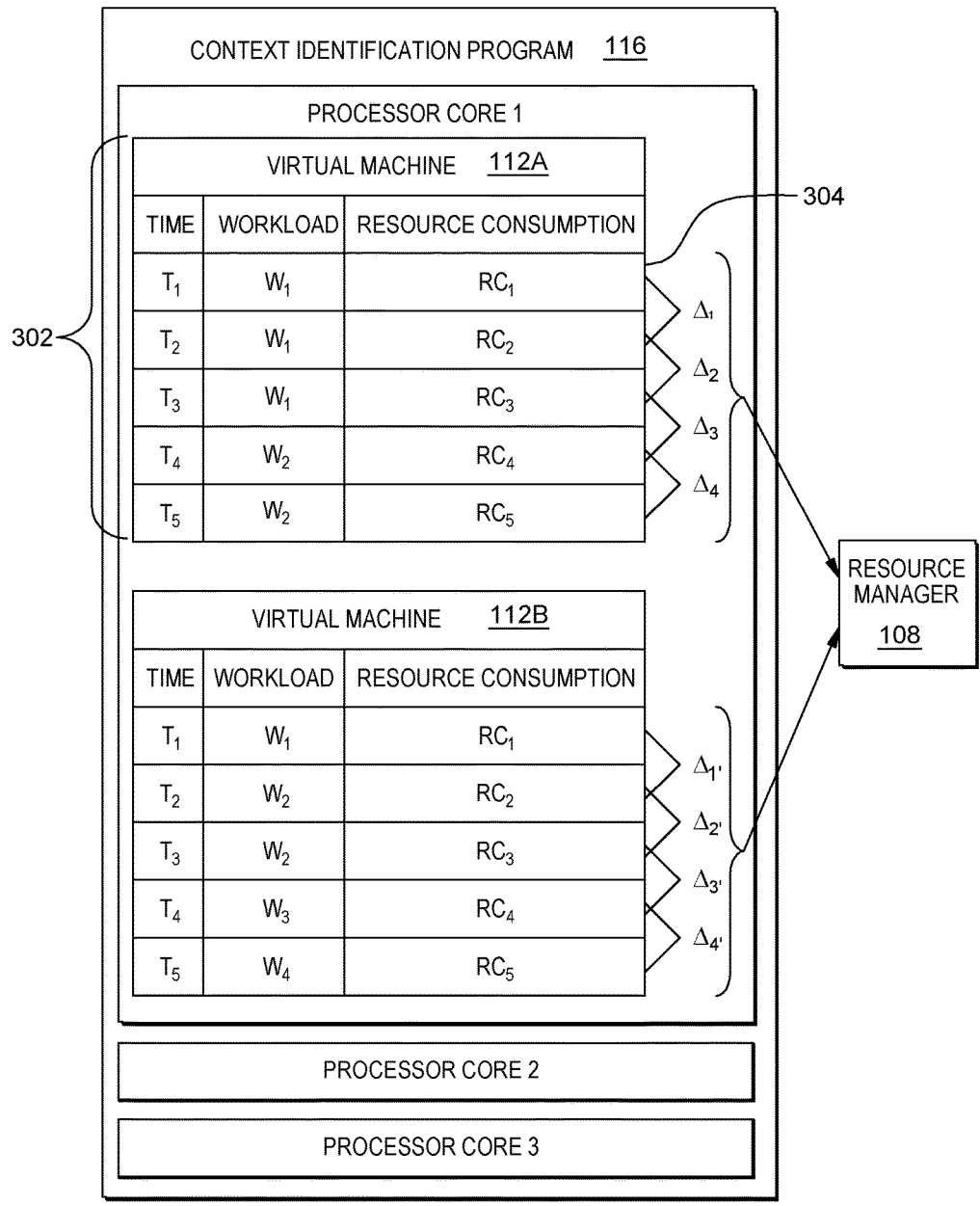
FIG. 3 depicts one embodiment of a communication between a resource manager and the context identification software resulting in an allocation adjustment method that may be executed by a resource manager, in accordance with the present invention.

FIG. 3 depicts one embodiment of the resource consumption data collected by context identification program 116. Context identification program 116 collects resource consumption data 302 for each processor core and each virtual machine present on the one or more processor cores. In another embodiment, context identification program 116 collects resource consumption data for one or more processors and each virtual machine present on the one or more processors. Context identification program 116 collects time ($T_1$-$T_5$), workload, and resource consumption data 302 for each virtual machine, such as virtual machine 112A and virtual machine 112B in the depicted embodiment, located on one or more processors associated with physical server 102.

Context identification program 116 collects workload identification, resource consumption data 302 per workload, virtual machine identification, and processor or processor core data at each time interval. As shown in exemplary FIG. 3, context identification program 116 records which workload occupies virtual machine 112A at $T_1$ through $T_5$ as well as the workload resource consumption at each of the time intervals for processor core 1. The recorded data is aggregated into a rolling buffer. Context identification program 116 simultaneously records the same information for virtual machine 112B and aggregates the data collected for virtual machine 112B into the rolling buffer. Context identification program 116 calculates the changes in resource consumption between subsequent time intervals for each virtual machine. Context identification program 116 provides a value associated with a positive or negative change in resource consumption which is represented as Δ 304 in FIG. 3. Resource manager 108 may pull the aggregated data in the rolling buffer from context identification program 116. In another embodiment, context identification program 116 may periodically send the recorded data to resource manager 108.

Figure 4:
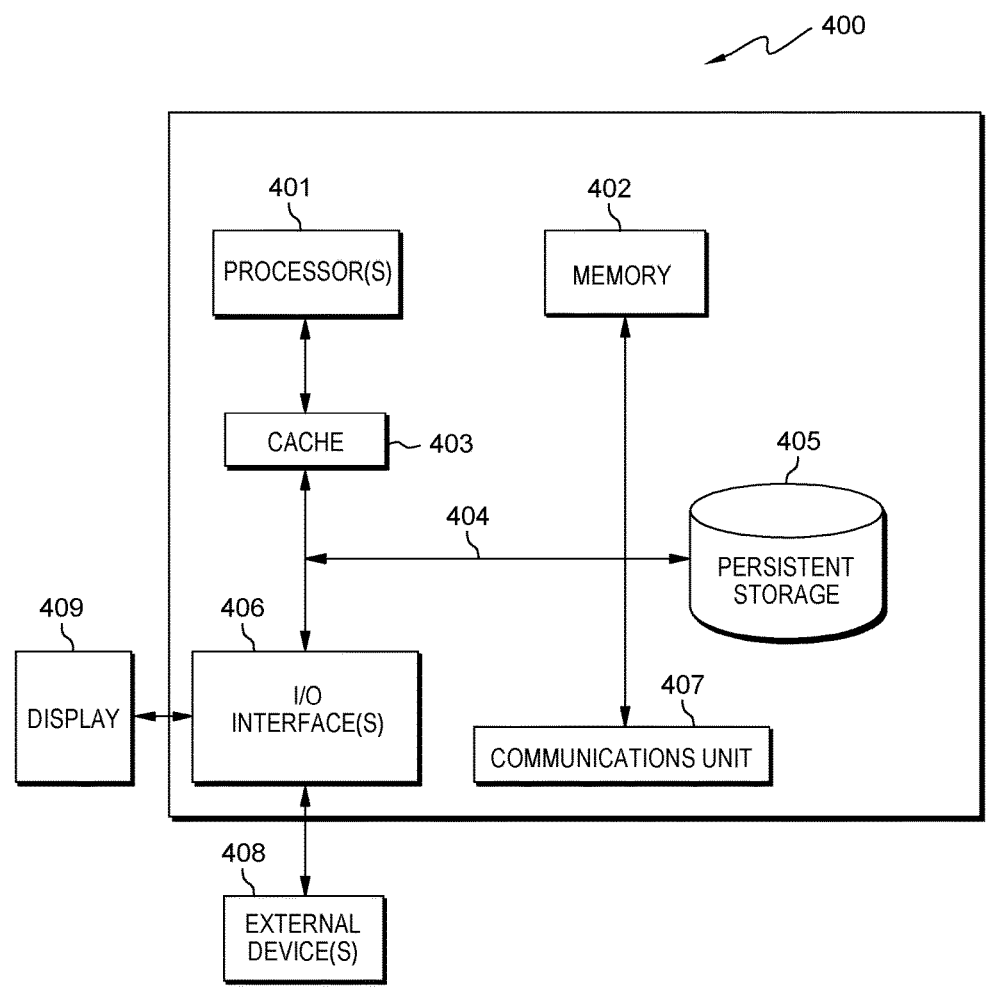
FIG. 4 is a block diagram of components of a computer system, such as the physical server of FIG. 1, in accordance with an embodiment of the present invention.

FIG. 4 depicts computer system 400, where management console 104 is an example of computer system 400 that includes resource manager 108. The computer system includes processors 401, cache 403, memory 402, persistent storage 405, communications unit 407, input/output (I/O) interface(s) 406 and communications fabric 404. Communications fabric 404 provides communications between cache 403, memory 402, persistent storage 405, communications unit 407, and input/output (I/O) interface(s) 406. Communications fabric 404 can be implemented with any architecture designed for passing data and/or control information between processors (such as microprocessors, communications and network processors, etc.), system memory, peripheral devices, and any other hardware components within a system. For example, communications fabric 404 can be implemented with one or more buses or a crossbar switch.

Memory 402 and persistent storage 405 are computer readable storage media. In this embodiment, memory 402 includes random access memory (RAM). In general, memory 402 can include any suitable volatile or non-volatile computer readable storage media. Cache 403 is a fast memory that enhances the performance of processors 401 by holding recently accessed data, and data near recently accessed data, from memory 402.

Program instructions and data used to practice embodiments of the present invention may be stored in persistent storage 405 and in memory 402 for execution by one or more of the respective processors 401 via cache 403. In an embodiment, persistent storage 405 includes a magnetic hard disk drive. Alternatively, or in addition to a magnetic hard disk drive, persistent storage 405 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 405 may also be removable. For example, a removable hard drive may be used for persistent storage 405. Other examples include optical and magnetic disks, thumb drives, and smart cards that are inserted into a drive for transfer onto another computer readable storage medium that is also part of persistent storage 405.

Communications unit 407, in these examples, provides for communications with other data processing systems or devices. In these examples, communications unit 407 includes one or more network interface cards. Communications unit 407 may provide communications through the use of either or both physical and wireless communications links. Program instructions and data used to practice embodiments of the present invention may be downloaded to persistent storage 405 through communications unit 407.

I/O interface(s) 406 allows for input and output of data with other devices that may be connected to each computer system. For example, I/O interface 406 may provide a connection to external devices 408 such as a keyboard, keypad, a touch screen, and/or some other suitable input device. External devices 408 can also include portable computer readable storage media such as, for example, thumb drives, portable optical or magnetic disks, and memory cards. Software and data used to practice embodiments of the present invention can be stored on such portable computer readable storage media and can be loaded onto persistent storage 405 via I/O interface(s) 406. I/O interface(s) 406 also connect to display 409.

Display 409 provides a mechanism to display data to a user and may be, for example, a computer monitor.

Resource consumption monitoring and resource allocation are critical components of cloud computing. It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
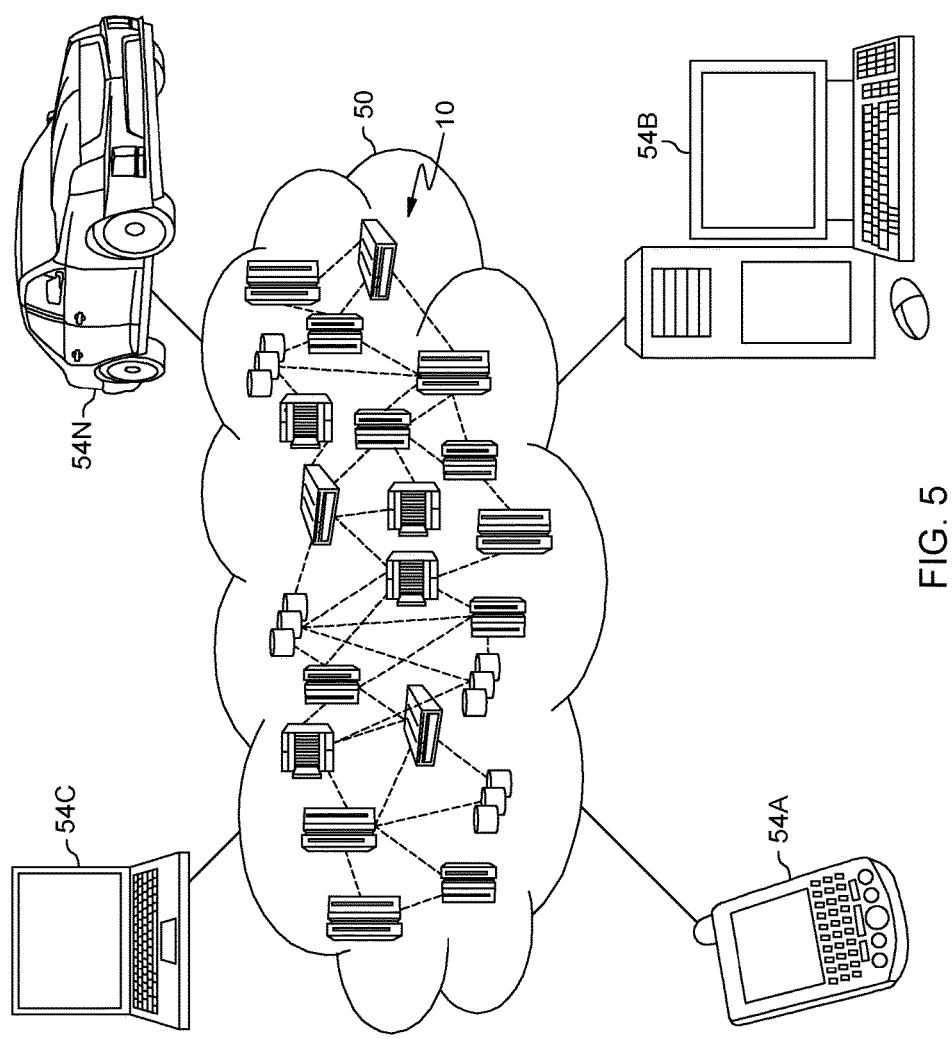
FIG. 5 depicts a cloud computing environment in accordance with an embodiment of the present invention.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Cloud computing nodes 10 may communicate with one another. In an embodiment, cloud computing nodes 10 may contain physical server 102. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that cloud computing nodes 10 and cloud computing environment 50 can communicate with any type of computerized device over any type of network and/or network addressable connection (e.g., using a web browser).

Figure 6:
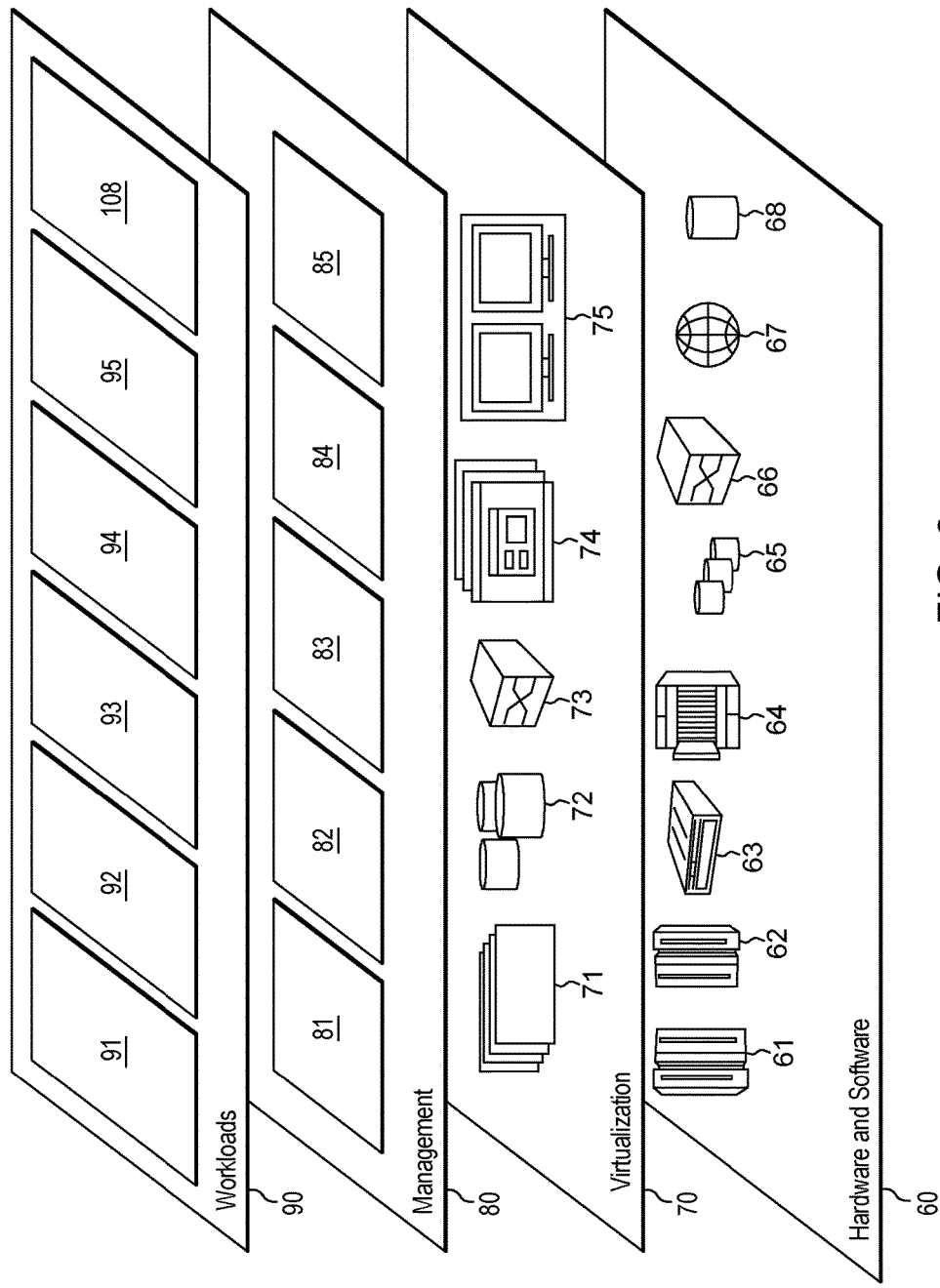
FIG. 6 depicts abstraction model layers in accordance with an embodiment of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and mobility engine 108.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD- ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer program product for collecting and processing performance metrics, the computer program product comprising:
   one or more computer readable storage devices and program instructions stored on the one or more computer readable storage devices, the stored program instructions comprising:
   program instructions to assign an identifier corresponding to a first workload associated with a first virtual machine;
   program instructions to record resource consumption data of at least one processor, wherein the at least one processor contains the first virtual machine, at a performance monitoring interrupt;
   program instructions to create a relational association of the first workload and the first virtual machine to the resource consumption data of the at least one processor;
   program instructions to determine if the first workload is complete;
   responsive to determining that the first workload is not complete, program instructions to calculate a difference in recorded resource consumption data between the performance monitoring interrupt and a previous performance monitoring interrupt;

program instructions to assign an identifier corresponding to a second workload associated with the first virtual machine;
program instructions to record resource consumption data of at least one processor, wherein the at least one processor contains the first virtual machine, at a performance monitoring interrupt;
program instructions to aggregate the recorded resource consumption data to provide one or more resource consumption estimates; and
program instructions to notify a resource manager of a workload switch between the second workload and the third workload and data regarding changes in resource consumption of the at least one processor over time.

2. The computer program product of claim 1, further comprising:
program instructions to create a relational association of the second workload and the first virtual machine to the resource consumption data of the at least one processor;
program instructions to determine if the second workload is complete; and
responsive to determining that the second workload is complete, program instructions to switch the first virtual machine to a third workload.

3. The computer program product of claim 1, wherein a first workload includes inbound input-output transaction from input-output devices and accelerators associated with the first virtual machine.

4. The computer program product of claim 1, wherein the resource consumption data is selected from a group consisting of: one or more time stamps, one or more identified workloads, and one or more resource consumption estimates associated with the one or more time stamps.

5. The computer program product of claim 1, wherein program instructions to create a relational association between a first workload and a first virtual machine further comprises program instructions to use the calculated difference in resource consumption between the performance monitoring interrupt and a previous interrupt to track a change in resource consumption of the at least one processor over time.

6. A computer system for collecting and processing performance metrics, the computer system comprising:
one or more computer processors;
one or more computer readable storage devices;
program instructions stored on the one or more computer readable storage devices for execution by at least one of the one or more computer processors, the stored program instructions comprising:
program instructions to assign an identifier corresponding to a first workload associated with a first virtual machine;
program instructions to record resource consumption data of at least one processor, wherein the at least one processor contains the first virtual machine, at a performance monitoring interrupt;
program instructions to create a relational association of the first workload and the first virtual machine to the resource consumption data of the at least one processor;
program instructions to determine if the first workload is complete;
responsive to determining that the first workload is not complete, program instructions to calculate a difference in recorded resource consumption data between the performance monitoring interrupt and a previous performance monitoring interrupt;
program instructions to assign an identifier corresponding to a second workload associated with the first virtual machine;
program instructions to record resource consumption data of at least one processor, wherein the at least one processor contains the first virtual machine, at a performance monitoring interrupt;
program instructions to aggregate the recorded resource consumption data to provide one or more resource consumption estimates; and
program instructions to notify a resource manager of a workload switch between the second workload and the third workload and data regarding changes in resource consumption of the at least one processor over time.

7. The computer system of claim 6, further comprising:
program instructions to create a relational association of the second workload and the first virtual machine to the resource consumption data of the at least one processor;
program instructions to determine if the second workload is complete; and
responsive to determining that the second workload is complete, program instructions to switch the first virtual machine to a third workload.

8. The computer system of claim 6, wherein a first workload includes inbound input-output transaction from input-output devices and accelerators associated with the first virtual machine.

9. The computer system of claim 6, wherein program instructions to create a relational association between a first workload and a first virtual machine further comprises program instructions to use the calculated difference in resource consumption between the performance monitoring interrupt and a previous interrupt to track a change in resource consumption of the at least one processor over time.

* * * * *